(12) United States Patent
Mukherjee et al.

(10) Patent No.: US 8,660,816 B2
(45) Date of Patent: Feb. 25, 2014

(54) METHOD, SYSTEM, AND COMPUTER PROGRAM PRODUCT FOR DETERMINING A HANG STATE AND DISTINGUISHING A HANG STATE FROM AN IDLE STATE

(75) Inventors: Joy Mukherjee, Bangalore (IN); Angelo Pruscino, Los Altos, CA (US); Sunil Kumar, Foster City, CA (US); Sujeet Kumar, Bangalore (IN); Anuj Tripathi, Bangalore (IN); Macharapu Sai Prasanth, Nagar Gannavaram (IN)

(73) Assignee: Oracle International Corporation, Redwood Shores, CA (US)

( * ) Notice: Subject to any disclaimer, the term of this patent is extended or adjusted under 35 U.S.C. 154(b) by 376 days.

(21) Appl. No.: 12/437,365

(22) Filed: May 7, 2009

(65) Prior Publication Data
US 2010/0286952 A1    Nov. 11, 2010

(51) Int. Cl.
*G06F 11/34* (2006.01)
(52) U.S. Cl.
USPC ........... 702/182; 702/179; 702/186; 702/188; 713/323; 714/37; 714/38.12; 714/38.13; 714/47.1; 714/49; 718/104
(58) Field of Classification Search
USPC .................. 702/179, 182, 188, 186; 713/323; 718/104; 714/37, 38.12, 38.13, 47.1, 714/49
See application file for complete search history.

(56) References Cited

U.S. PATENT DOCUMENTS

| | | | |
|---|---|---|---|
| 5,325,490 A | 6/1994 | Brasseur | |
| 7,278,063 B2 | 10/2007 | Billeci | |
| 2008/0016409 A1 | 1/2008 | Billeci | |
| 2008/0263556 A1* | 10/2008 | Zoll et al. | 718/104 |
| 2009/0096797 A1* | 4/2009 | Du et al. | 345/506 |

OTHER PUBLICATIONS

Long Wang; An OS-level Framework for Providing Application-Aware Reliability; IEEE; 2006; 12th Pacific Rim International Symposium on Dependable Computing.
Long Wang; Reliability MicroKernel: Providing Application-Aware Reliability in the OS; IEEE; Dec. 2007; pp. 597-614; vol. 56, No. 4.
Long Wang; An Operating-System-Level Framework for Providing Application-Aware Reliability; pp. 1-23.

* cited by examiner

*Primary Examiner* — Alexander H Taningco
*Assistant Examiner* — Paul D Lee
(74) *Attorney, Agent, or Firm* — Vista IP Law Group, LLP (57) ABSTRACT

A system, method, and computer program product are described for distinguishing between a computing system that is hung in a hang state and systems that are in an idle or otherwise non-hang state which do not need intervention before regaining the ability to adequately process work. According to some approaches, heuristics are employed to perform hang and idle system detection and validation. Data representative of systems resources are analyzed and transformed in order to identify systems that are in a hang state.

24 Claims, 6 Drawing Sheets

METHOD, SYSTEM, AND COMPUTER PROGRAM PRODUCT FOR DETERMINING A HANG STATE AND DISTINGUISHING A HANG STATE FROM AN IDLE STATE

BACKGROUND AND SUMMARY

Embodiments of the invention are directed to an approach for determining whether a computing system/application is in an unresponsive "hang" state and for distinguishing a hang state from an idle state.

Computing systems are generally used to process work on the behalf of users or other resource consumers. Work requests are issued by the users and consumers of the system, which are sent to processing entities that handle execution and processing of the work requests. Such processing entities include, for example, processes, threads, tasks, nodes, and various types of distributed entities. For the purposes of explanation, such processing entities will be referred herein, without limitation, as "processes."

Any type of work may be suitably performed by processes within the computing system. As just one common example, the computing system may be utilized to perform work relating to database processing. One or more users may desire to query data within a database system, where the query processing work is sent for processing by one or more processes at a server running a database management system.

Various resources may be consumed or allocated during the process of performing work in a computing system. Examples of hardware resources that may be consumed or allocated include the CPU (central processing unit), networking resources, I/O (input/output) resources, memory, and persistent storage space. Examples of system and application resources include database objects, locks, and processes. These resources are often allocated based upon requests and actions taken by the processes to perform the work requested by users.

The performance and responsiveness of the computing system often depends upon the availability of sufficient resources to handle the work and of the general level of operating health for resources within the system. If there are sufficient available resources and if there are not otherwise any operating problems with the system, then the user requests should be processed in a timely manner. If, however, there are insufficient resources or if the system experiences operating problems, then it is quite possible that user requests are not handled in a timely manner. In this circumstance, the operating problems or resource insufficiencies may need to be addressed before further work can be adequately performed in the system.

However, the perception of low activity in handling user requests does not necessarily mean that there is a system-related problem that needs to be corrected. In some cases, it is possible that there is no system problem at all, even though there is little ongoing processing activity. For example, periods of lower activity may be merely a symptom of a system that is in an idle state, where the system is perfectly capable of processing work once the work is actually requested by users.

Some embodiments of the present invention provide approaches for distinguishing between a computing system that is in a hang state and a system that is in an idle or otherwise non-hang state and which does not need intervention before regaining the ability to adequately process work. According to some embodiments, heuristics are employed to perform hung and idle system detection and differentiation. Data representative of systems resources are analyzed and transformed in order to identify systems that are in a hang state.

Other and additional objects, features, and advantages of the invention are described in the detailed description, figures, and claims.

DETAILED DESCRIPTION

Some embodiments of the present invention provide approaches for distinguishing between computing systems that are in a hang state and systems that are in an idle or otherwise non-hang state and which do not need intervention before regaining the ability to adequately process work. According to some embodiments, heuristics are employed to perform hung and idle system detection and differentiation. Data representative of systems resources are analyzed and transformed in order to identify systems that are in a hang state.

To illustratively explain embodiments of the invention, the present document will specifically describe and refer to computing systems that perform database processing. It is noted, however, that the present invention is applicable to many other types of computing system architectures and applications as well, and is not to be limited to database systems unless explicitly claimed as such.

Figure 1:
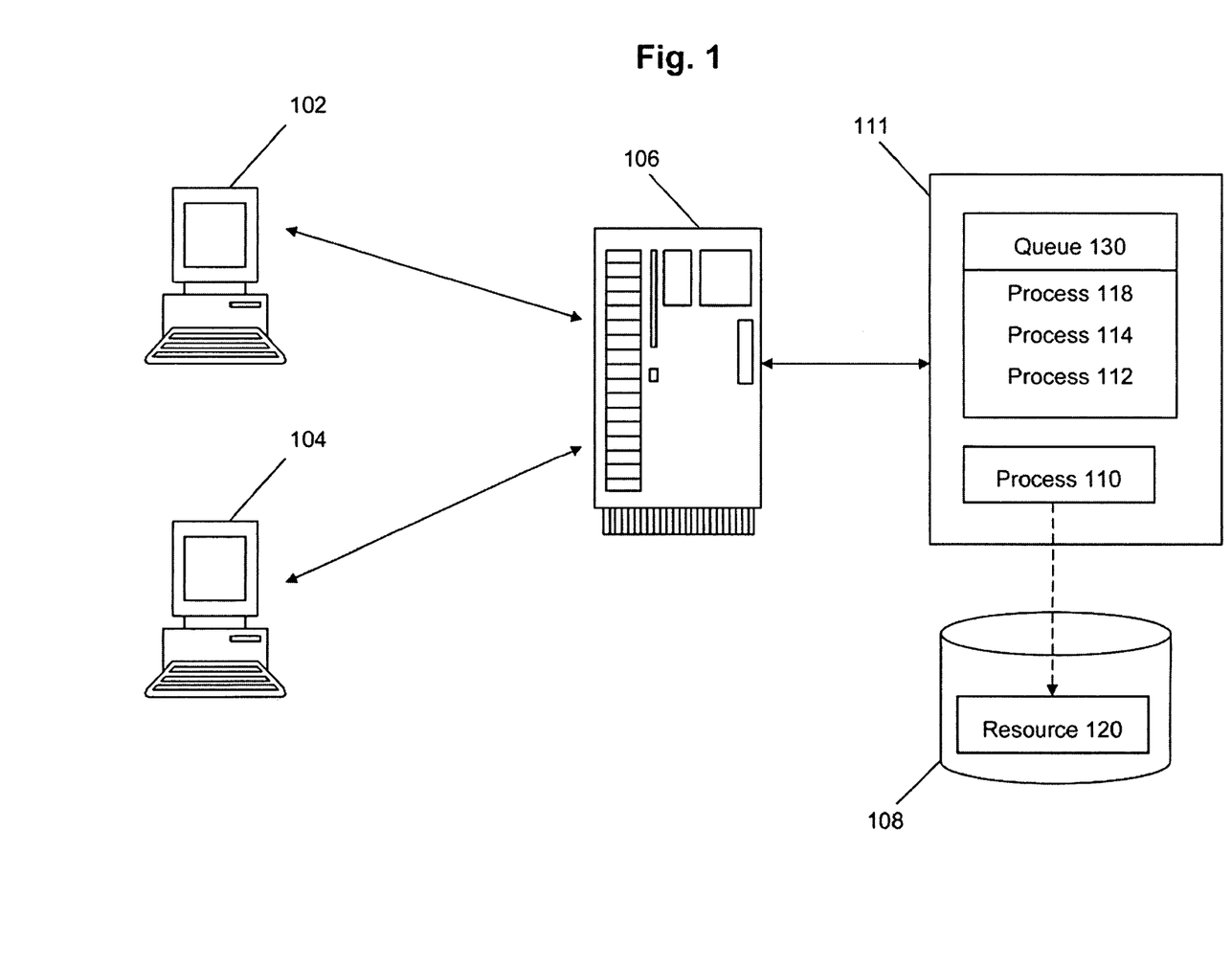
FIG. 1 shows an architecture of a system for performing distributed database processing.

FIG. 1 shows an architecture of a system for performing distributed database processing. The system includes a database management system (DBMS) server 111 that manages a database 108, which includes data 120 that is accessed by one or more users at user stations 102 and 104. The users at user stations 102 and 104 correspond to any individual, organization, or other entity that uses system to perform data processing operations. The user stations 102 and 104 and database management system 111 can be implemented using any suitable computing platforms.

Work requests issued from user stations 102 and 104 are handled by middleware at middle tier server 106. The middleware server 106 acts as an intermediary to establish connections to the DBMS server 111 and to route work to processes at server 111. A process 110 at DBMS server 111 performs the workload required to implement query processing at DBMS server 111.

In operation, it is quite possible that at some point in time, a state of very low activity or perceived inactivity will be observed at the DBMS server 111. For example, this may be observed based upon the occurrence of numerous requests being placed to the DBMS server 111, but where the requests are not being processed in a timely or expeditious manner. Therefore, a queue 130 of requests/processes at DBMS 111 will continue to grow larger and larger over time.

This may occur, for example, if some sort of deadlock or resource blocking condition exists at DBMS server 111. An example of a deadlock condition is where a first processing entity is waiting upon a resource to be made available before it can proceed with computing operations. However, the resource may be held by a second processing entity that itself cannot proceed since the second processing entity is waiting upon a resource currently being held by the first processing entity. This is a deadlock situation since neither the first nor the second processing entities can proceed without the other first releasing its respective resource. Resource blocking generally occurs when a process cannot proceed because another entity has locked a resource that is needed by that process to perform its work. The state of inactivity could also be cause by some sort of system problem at the DBMS server 111.

When such conditions occur, it is important to be able to efficiently and accurately determine the existence of a hang state so that the hang state can be addressed and work can be processed again in the system. Conventionally, monitoring programs are used to diagnose the performance issues and/or defects of a system, or to report and analyze states and events on a system. These monitoring entities report hangs and either act automatically or recommend user intervention to resolve hangs by evicting one of the execution entities based on some heuristics, thus breaking the cycle or the chain. For such monitoring entities it is critical that they are able to distinguish between the "hang" and "idle" states of the system to avoid making faulty conclusions about the no-progress state and eviction recommendations thereof, because any such action affects both performance and availability characteristics of a machine or a set of machines. Currently, no conventional systems are able to effectively distinguish between a hang and an idle state on a computing system.

Embodiments of the present invention perform heuristic analysis of resources in the computing system to detect the presence of a hang state. According to some embodiments, information about resource consumption levels are analyzed in conjunction with system workloads in a manner that allows one to distinguish between a true hang state and other states of lower activity which are not hang states, e.g., idle states. According to some embodiments, hang states are identified upon detection of a no-progress state on a system when several execution entities (processes, threads, etc.) wait to acquire resources held by another entity. This state could manifest in tile form of cycles (wait-for-graphs) or chains (where the last process in the chain is holding onto an entity and is not making any progress due to some other system failure). Idle states are identified as a no-progress state on a system when the execution entities (processes, threads, etc.) are not consuming any resources, as there is nothing to be processed.

Figure 2:
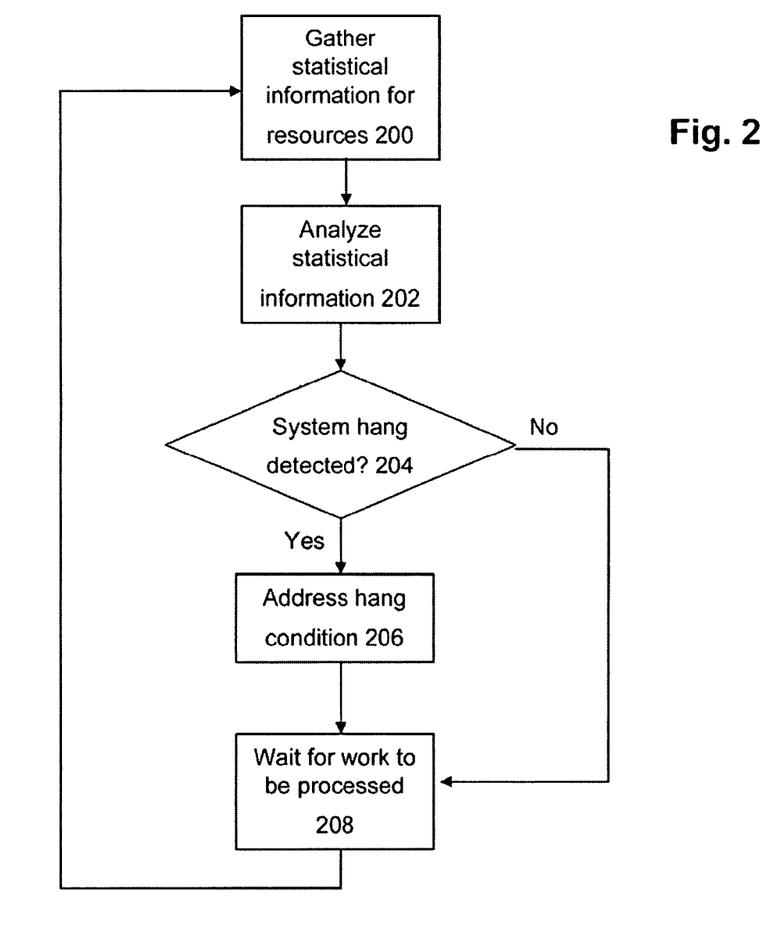
FIG. 2 illustrates a high level flowchart of a process for detecting a hang state in a computing system.

FIG. 2 illustrates a high level flowchart of a process for detecting a hang state in a computing system according to some embodiments of the invention. At 200, statistical information is gathered for resources at computing system for which there is a concern about the hang state, e.g., at DBMS server 111. The statistical information could be for any resource which is acquired, held, or allocated for processing to perform work at the computing system. Examples of such resources for which statistical information is collected include CPU, I/O, network, memory, and disk storage.

Any useful statistic may be collected for these resources. For example, CPU usage levels can be collected for the CPU resource. Similarly, I/O operation counts (e.g., read or write operations) or I/O throughput statistics may be collected for the I/O resources. Network usage, activity or latency statistics may be collected for the network resource, e.g., send rates, receive rates, error or dropped packet counts. Memory usage or paging statistics can be collected for the memory resource, and disk capacity, usage or activity statistics collected for the disk storage resource.

In addition, statistical information about workload or processing activities may be collected at the computing system. For example, the number of processes running on the CPU can be collected to identify trends in the increase or decrease of work at the computing system.

Figure 3:
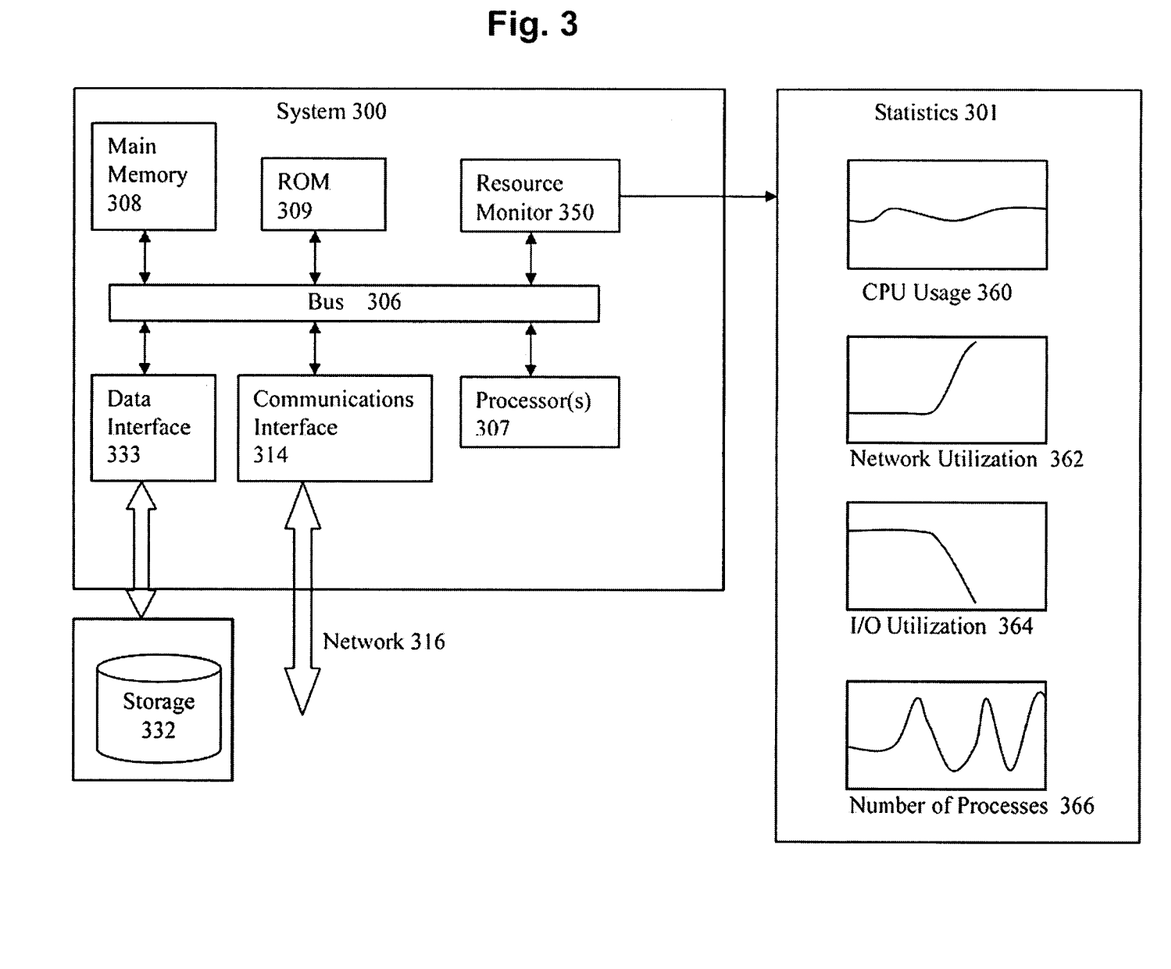
FIG. 3 illustrates a process of collecting statistics for resources in a computing system.

FIG. 3 illustrates this process of collecting statistics for resources in a computing system 300. For the purposes of illustration, the example system 300 comprises one or more CPU processors 307, main memory 308, read-only memory 309, a data interface 333 to a storage device 332, a communications interface 314 to a network 316, and a system bus 306 that interconnects these components.

A resource monitor 350 tracks and collects information about resources on the system 300 to generate statistics 301. The resource monitor 350 transforms the physical nature of the data implicit in the resources themselves into data values that can be analyzed for purposes of determining a hang state.

Statistics 301 include, for example, CPU usage statistics 360, network utilization statistics 362, I/O utilization statistics 364, and a process count 366. As shown in FIG. 3, the statistics can be tracked over time to identify trends and spikes in the statistics. For example, the CPU usage statistics 360 is represented as a chart that shows a relatively steady consumption of CPU resources over time. The network utilization statistics 362 is represented as a chart that shows a sharp upward spike in network usage. The I/O utilization statistics 364 is represented by a chart that shows a sharp downward spike in I/O usage. The process count statistics 366 is represented by a chart that shows rapid fluctuations in the number of processes running on the CPU 307.

Returning back to FIG. 2, at 202, the statistical information is analyzed to identify the existence of a hang state at the computing system. Any suitable heuristic may be employed to detect the presence of a hang state, where the heuristic may be different for different computing platforms, different computing applications, and different sets of resources that are affected by the workload processing.

For example, when observing entities (e.g., operating system entities) in some embodiments, a hang state is determined to exist when there are sharp, quick, and simultaneous (or near simultaneous) drops detected in the consumption levels of resources (e.g., such as CPU, IO, and network traffic), even when the number of active consumer processes stays fairly constant or rises. The hang state may also be determined if resources are consumed under a minimum threshold level, but the number of consuming processes keeps rising. The detection of the hang state may be further bolstered if there is detection of a steady increase in CPU queue length.

Likewise a state is declared as "idle" if there is a gradual slowdown in consumption of various resources along with a gradual reduction in the number of consumer processes. The idle state may also exist if there is a sudden drop in resource consumption accompanied by sudden departure of a number of processes. In both cases, the CPU queue length will likely stay at a low level.

Based upon these analysis actions, at 204, a determination is made whether a hang state has been detected. If so, then at 206 the hang state is addressed in a manner designed to allow useful processing to continue on the computing system. One possible approach is to stop and then re-start the computing system. In this way, re-ordering of processing may occur such that deadlocks are avoided. Alternatively, if the hang state is detected in a manner in which the specific problems are identified, e.g., a specific deadlock situation is identified, then specific problem resolution algorithms such as deadlock resolution algorithms may be employed to address the problems. Thereafter, at 208, the system will wait for work to be processed.

According to some embodiments, a hang state is determined using an approach that checks for sudden changes or spikes in resource consumption levels, and based at least in part on identification of such spikes in consumption, will make a determination of existence for the hang state. To detect sudden changes or spikes in resource consumption levels, MAD (Median Absolute Deviation) analysis can be performed upon the collected statistics to identify outliers in the data set. In the field of statistical analysis, MAD refers to a resistance measure of the variability of a data sample. For example, for a univariate data set $X_1, X_2, \ldots, X_n$, the MAD is defined as $$\text{MAD} = \text{median}_i(|X_i - \text{median}_j(X_j)|),$$

where, starting with the residuals or deviations from the data's median, the MAD is the median of their absolute values. To detect sudden changes (or spikes) in resource consumption, the absolute deviation of a data point is measured against MAD. If the concerned data point's deviation is greater than MAD by more than a threshold factor, a spike (in other words, an unexpectedly high/low data point) is detected. In purely statistical terms, such a data point is called an 'outlier'.

To determine gradual changes in resource consumption in a time interval, no spikes or sudden changes should be seen in the data set. However, the consumption levels can be checked against pre-defined low-marking thresholds of resource consumption.

Figure 4:
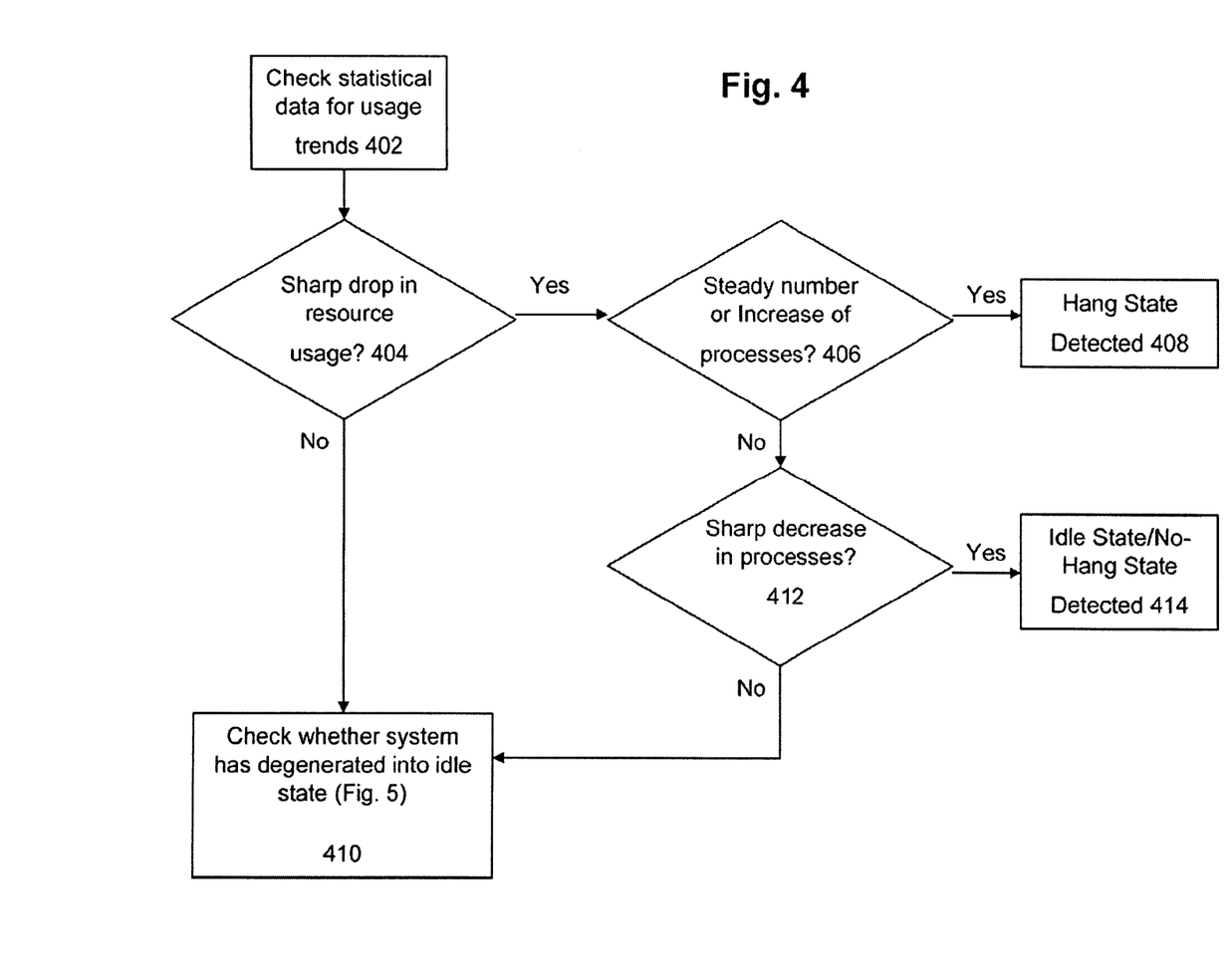
FIG. 4 shows a flowchart of an approach for performing hang state detection where resource usage trends are analyzed.

FIG. 4 shows a flowchart of an approach for implementing this type of hang state detection algorithm, where resource usage trends are analyzed. Therefore, at 402, the statistical data is checked for the presence of resource usage/consumption trends.

A determination is made at 404 whether there are any sharp drops (e.g., down spikes) in resource consumption. If so, then the number of processes running on the system/CPU is checked. A determination is made at 406 regarding any trends for the number of processes in the system. If the number of processes stays relatively steady or rises, then a hang state is identified at 408. If, however, the number of processes shows a downward spike, then an idle state is identified at 414.

Figure 5:
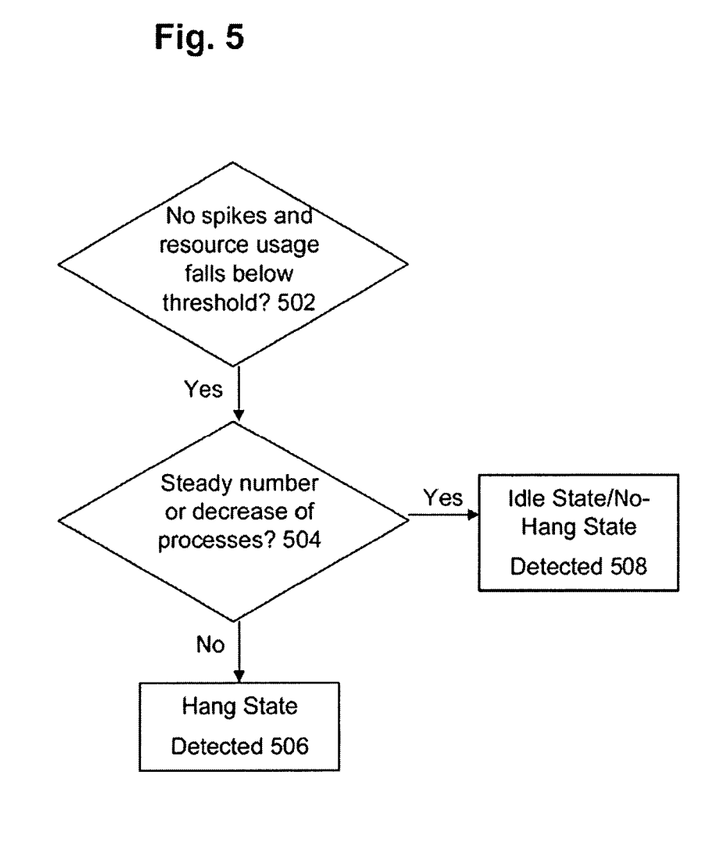
FIG. 5 shows a flowchart of an approach for checking whether a system has degenerated into an idle state.

If neither a hang state nor an idle state is detected so far, then at 410, the approach checks whether the system has slowly degenerated into an idle state. FIG. 5 shows a flowchart of an approach for checking whether a system has degenerated into an idle state.

At 502, a determination is made whether there exists one or more spikes in resource usage/consumption, e.g., drops in usage or consumption, and if there are no spikes, whether die usage falls below defined low-marking thresholds. It is noted that the low-marking thresholds may be individually selected and calibrated for each specific resource. Indeed, such thresholds may only be set for certain of the resources, where one or more of the resources are not associated with such thresholds. 502 may be configured to check for spikes or thresholds for only certain combinations of the one or more resources being monitored and for which statistics are being collected.

If no spikes are detected and usages fall below our pre-defined low-marking thresholds, then a check is performed upon the number of consumer processes in the system at 504. If the number of consumer processes stays the same or gradually drops, then an idle state is identified at 508. If, however, the resources being checked are under the threshold but the number of consuming processes keeps rising, then a hang state is identified at 506. Lastly, if either a hang state or an idle state is detected, the approach checks the CPU queue length and confirm as mentioned above.

Therefore, what has been described is an improved approach for determining the existence of a hang state for a computing system. According to some embodiments, the approach can be used to distinguish between a hang state and an idle state so that corrective actions can be appropriately taken to resolve hang states.

System Architecture Overview

Figure 6:
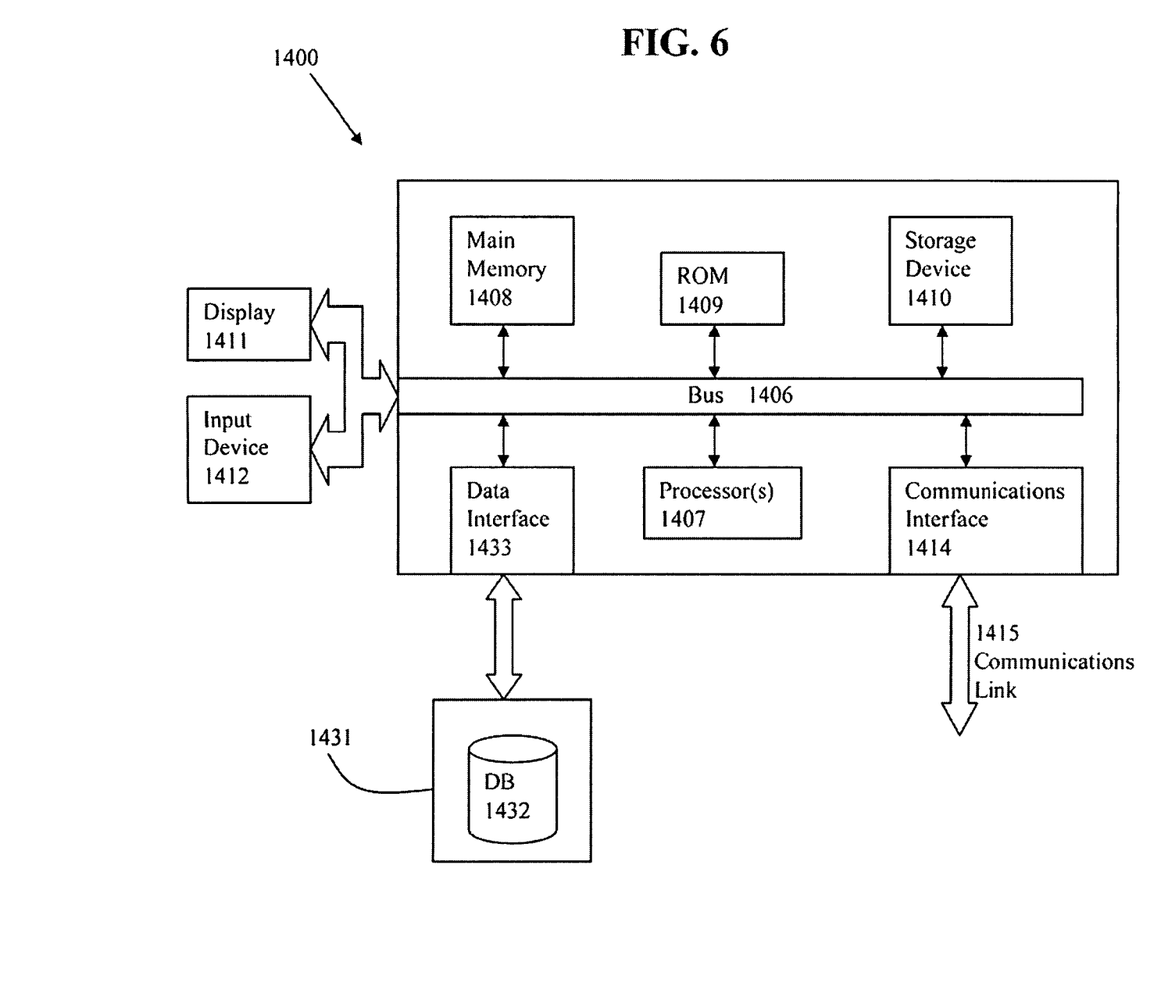
FIG. 6 shows an architecture of an example computing system with which the invention may be implemented.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. The computer system 1400 may communicate with a database 1432 in an external storage device 1431 via data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer implemented method for detecting and distinguishing a hang state for a computing system, comprising:
    collecting operating data for one or more resources within a computing system, wherein the one or more resources comprises at least a hardware resource;
    generating statistics for the operating data for the one or more resources; and
    analyzing, by using a processor, the statistics for the operating data for the one or more resources to distinguish between the hang state and an idle state for the computing system, in which the hang state and the idle state are distinguished by analyzing a trend in a level of resource consumption of the computing system relative to a trend in a count of processing entities running on the computing system.

2. The method of claim 1 in which the at least one hardware resource comprises a CPU resource, memory resource, network resource, or I/O resource.

3. The method of claim 1 in which the statistics comprises the processing entity count and at least one of CPU utilization, I/O activity, memory utilization, network performance or utilization.

4. The method of claim 3 in which the idle state is identified based at least in part upon a sharp drop in resource consumption level and a decrease in processing entity count.

5. The method of claim 3 in which the hang state is identified based at least in part on a sharp drop in resource consumption level with a level amount of or increase in processing entity count.

6. The method of claim 3 in which the idle state is identified based at least upon no spikes in resource consumption level where the resource consumption level falls below a threshold level and a steady amount of or decrease in processing entity count.

7. The method of claim 3 in which the hang state is identified based at least in part upon no spikes in resource consumption level where the resource consumption level falls below a threshold level and there is an increase in processing entity count.

8. A system for detecting and distinguishing a hang state for a computing system comprising:
    a processor for:
    collecting operating data for one or more resources within a computing system, wherein the one or more resources comprises at least a hardware resource;
    generating statistics for the operating data for the one or more resources; and
    analyzing the statistics for the one or more resources to distinguish between the hang state and an idle state for the computing system, in which the hang state and the idle state are distinguished by analyzing a trend in a level of resource consumption of the computing system relative to a trend in a count of processing entities running on the computing system.

9. The system of claim 8 in which the at least one hardware resource comprises a CPU resource, memory resource, network resource, or I/O resource.

10. The system of claim 8 in which the statistics comprises the processing entity count and at least one of CPU utilization, I/O activity, memory utilization, network performance or utilization.

11. The system of claim 10 in which the idle state is identified based at least in part upon a sharp drop in resource consumption level and a decrease in processing entity count.

12. The system of claim 10 in which the hang state is identified based at least in part on a sharp drop in resource consumption level with a level amount of or increase in processing entity count.

13. The system of claim 10 in which the idle state is identified based at least upon no spikes in resource consumption level where the resource consumption level falls below a threshold level and a steady amount of or decrease in processing entity count.

14. The system of claim 10 in which the hang state is identified based at least in part upon no spikes in resource consumption level where the resource consumption level falls below a threshold level and there is an increase in processing entity count.

15. A non-transitory computer program product that includes a non-transitory computer readable medium, the non-transitory computer readable medium comprising a plurality of computer instructions which, when executed by a processor, cause the processor to execute a process for detecting and distinguishing a hang state for a computing system, the process comprising:
    collecting operating data for one or more resources within a computing system, wherein the one or more resources comprises at least a hardware resource;
    generating statistics for the operating data for the one or more resources; an
    analyzing the statistics for the operating data for the one or more resources to distinguish between the hang state and an idle state for the computing system, in which the hang state and the idle state are distinguished by analyzing a trend in a level of resource consumption of the computing system relative to a trend in a count of processing entities running on the computing system.

16. The computer program product of claim 15 in which the at least one hardware resource comprises a CPU resource, memory resource, network resource, or I/O resource.

17. The computer program product of claim 15 in which the statistics comprises the processing entity count and at least one of CPU utilization, I/O activity, memory utilization, network performance or utilization.

18. The computer program product of claim 17 in which the idle state is identified based at least in part upon a sharp drop in resource consumption level and a decrease in processing entity count.

19. The computer program product of claim 17 in which the hang state is identified based at least in part on a sharp drop in resource consumption level with a level amount of or increase in processing entity count.

20. The computer program product of claim 17 in which the idle state is identified based at least upon no spikes in resource consumption level where the resource consumption level falls below a threshold level and a steady amount of or decrease in processing entity count.

21. The computer program product of claim 17 in which the hang state is identified based at least in part upon no spikes in resource consumption level where the resource consumption level falls below a threshold level and there is an increase in processing entity count.

22. A computer implemented method for detecting and distinguishing a hang state for a computing system, comprising:
- collecting operating data for one or more resources within a computing system, wherein the one or more resources comprises at least a hardware resource;
- generating statistics for the operating data for the one or more resources;
- detecting, by using a processor, a no progress state on the computing system;
- analyzing the statistics for the operating data for the one or more resources to distinguish between the hang state and an idle state for the computing system based at least in part upon detection of the no progress state, in which the hang state and the idle state are distinguished by analyzing a trend in a level of resource consumption of the computing system relative to a trend in a count of processing entities running on the computing system.

23. The computer implemented method of claim 22, in which the at least one hardware resource comprises a CPU resource, memory resource, network resource, or I/O resource.

24. The computer implemented method of claim 22, in which the statistics comprises the processing entity count and at least one of CPU utilization, I/O activity, memory utilization, network performance or utilization.

* * * * *

UNITED STATES PATENT AND TRADEMARK OFFICE
CERTIFICATE OF CORRECTION

| | |
|---|---|
| PATENT NO. | : 8,660,816 B2 |
| APPLICATION NO. | : 12/437365 |
| DATED | : February 25, 2014 |
| INVENTOR(S) | : Mukherjee et al. |

It is certified that error appears in the above-identified patent and that said Letters Patent is hereby corrected as shown below:

In the Specification

In column 3, line 45, delete "tile" and insert -- the --, therefor.

In column 5, line 54, delete "die" and insert -- the --, therefor.

Signed and Sealed this
First Day of July, 2014

Michelle K. Lee
*Deputy Director of the United States Patent and Trademark Office*